United States Patent
Yamamoto

(10) Patent No.: US 10,059,834 B2
(45) Date of Patent: Aug. 28, 2018

(54) RUBBER VIBRATION ISOLATOR COMPOSITION AND RUBBER VIBRATION ISOLATOR

(71) Applicant: BRIDGESTONE CORPORATION, Tokyo (JP)

(72) Inventor: Masaaki Yamamoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 72 days.

(21) Appl. No.: 15/303,810

(22) PCT Filed: May 13, 2015

(86) PCT No.: PCT/JP2015/063746
§ 371 (c)(1),
(2) Date: Oct. 13, 2016

(87) PCT Pub. No.: WO2015/186482
PCT Pub. Date: Dec. 10, 2015

(65) Prior Publication Data
US 2017/0029602 A1 Feb. 2, 2017

(30) Foreign Application Priority Data
Jun. 6, 2014 (JP) .................. 2014-117466

(51) Int. Cl.
*C08L 7/00* (2006.01)
*C08L 9/00* (2006.01)

(52) U.S. Cl.
CPC ..... *C08L 7/00* (2013.01); *C08L 9/00* (2013.01); *C08L 2205/02* (2013.01); *C08L 2205/06* (2013.01); *C08L 2312/00* (2013.01)

(58) Field of Classification Search
CPC ....................................................... C08L 7/00
See application file for complete search history.

(56) References Cited

U.S. PATENT DOCUMENTS

| | | | |
|---|---|---|---|
| 3,703,500 A | 11/1972 | Nast et al. | |
| 2014/0080979 A1 | 3/2014 | Yamamoto | |
| 2015/0031809 A1 | 1/2015 | Yamamoto | |
| 2015/0240054 A1* | 8/2015 | Yamamoto | C08K 5/435 524/169 |
| 2015/0299434 A1* | 10/2015 | Nagata | C08L 7/00 525/236 |

FOREIGN PATENT DOCUMENTS

| | | | | |
|---|---|---|---|---|
| CN | 103562294 A | 2/2014 | | |
| JP | 50-4374 B1 | 2/1975 | | |
| JP | 2003-306578 A | 10/2003 | | |
| JP | 2012-229323 A | 11/2012 | | |
| JP | 2013-091688 A | 5/2013 | | |
| JP | 2013-155298 A | 8/2013 | | |
| WO | 2013/114877 A1 | 8/2013 | | |
| WO | 2014/045743 A1 | 3/2014 | | |
| WO | WO-2014045743 A1 * | 3/2014 | ............ | C08K 5/435 |
| WO | 2014/080794 A1 | 5/2014 | | |
| WO | WO-2014080794 A1 * | 5/2014 | ............... | C08L 7/00 |

OTHER PUBLICATIONS

International Search Report of PCT/JP2015/063746 dated Aug. 18, 2015 [PCT/ISA/210].

* cited by examiner

*Primary Examiner* — Arrie L Reuther
(74) *Attorney, Agent, or Firm* — Sughrue Mion, PLLC

(57) ABSTRACT

The present invention addresses the problem of providing a rubber vibration isolator composition with which low temperature characteristics can be significantly improved while maintaining basic strength characteristics (hardness, tensile elongation, tensile strength), and a rubber vibration isolator obtained by curing said rubber composition. The present invention provides a rubber vibration isolator composition characterized in containing natural rubber, a high cis content isoprene rubber, a crosslinking agent and an aromatic sulfonamide having a specified chemical structure. The high cis content isoprene rubber refers to the cis-1,4 bond content being at least 95%.

4 Claims, No Drawings

RUBBER VIBRATION ISOLATOR COMPOSITION AND RUBBER VIBRATION ISOLATOR

CROSS REFERENCE TO RELATED APPLICATIONS

This application is a National Stage of International Application No. PCT/JP2015/063746, filed May 13, 2015, claiming priority based on Japanese Patent Application No. 2014-117466, filed Jun. 6, 2014, the contents of all of which are incorporated herein by reference in their entirety.

TECHNICAL FIELD

This invention relates to a rubber vibration isolator composition that can be advantageously used in both high-temperature and low-temperature environments, and to a rubber vibration isolator obtained by curing such a composition.

BACKGROUND ART

The basic characteristics required of rubber vibration isolators are strength properties for supporting a heavy body such as an engine, and a vibration isolating performance which absorbs and suppresses vibrations by the supported body. Moreover, the rubber vibration isolator, when used in a high-temperature environment such as an engine compartment, in addition to having, of course, excellent strength properties, a low dynamic-to-static modulus ratio and an excellent vibration isolating performance, is also required to have an excellent heat aging resistance and excellent compression set. Furthermore, because automobiles are used even in high-latitude regions, automotive rubber vibration isolators are also required to have good low-temperature properties.

Research on compounding given amounts of a rubber component, a crosslinking system and other additives for a rubber vibration isolator in order to impart such collectively outstanding properties is actively underway, and numerous patent applications have already been filed. The art in most such disclosures provides outstanding heat aging resistance and dynamic-to-static modulus ratio, but falls short in terms of, for example, low-temperature properties.

The applicant earlier disclosed (JP-A 2012-229323) a rubber vibration isolator composition which, by virtue of the addition of a given proportion of N-phenyl-N-(trichloromethylthio)benzenesulfonamide to the compounding ingredients of a crosslinked system, has a better heat aging resistance and dynamic-to-static modulus ratio than in the pre-existing art. However, there remains further room for improvement in the low-temperature properties of the rubber vibration isolator.

PRIOR ART DOCUMENTS

Patent Documents

Patent Document 1: JP-A 2012-229323

SUMMARY OF THE INVENTION

Problems to be Solved by the Invention

It is therefore an object of the invention to provide a rubber vibration isolator composition which is capable of improving the low-temperature properties while maintaining the basic strength characteristics (hardness, tensile elongation, tensile strength), and to provide a rubber vibration isolator obtained by curing such a rubber composition.

Means for Solving the Problems

The inventor has conducted extensive investigations in order to achieve the above objects, discovering as a result that, by adding a high-cis-content isoprene rubber to a rubber component composed primarily of diene rubber and also adding a compounding ingredient which is a crosslinking system that includes a crosslinking agent and an aromatic sulfonamide, due to the effects of using these ingredients together, the low-temperature properties can be greatly improved and it is possible to maintain good strength characteristics (hardness, tensile elongation, tensile strength).

Accordingly, the invention provides the following rubber vibration isolator composition and rubber vibration isolator.

[1] A rubber vibration isolator composition characterized by comprising natural rubber, a high-cis-content isoprene rubber having a cis-1,4 bond content of at least 95%, a crosslinking agent and an aromatic sulfonamide of a specific structural formula.

[2] The rubber vibration isolator composition of [1], wherein the weight ratio of the natural rubber to the high-cis-content isoprene rubber having a cis-1,4 bond content of at least 95% is from 95/5 to 45/55.

[3] The rubber vibration isolator composition of [1], wherein the content of aromatic sulfonamide is from 0.1 to 4 parts by weight per 100 parts by weight of the rubber component.

[4] A rubber vibration isolator obtained by curing the rubber composition of [1], [2] or [3].

Advantageous Effects of the Invention

The rubber vibration isolator composition of the invention has greatly improved low-temperature properties while maintaining good tensile characteristics (elongation, strength).

EMBODIMENT FOR CARRYING OUT THE INVENTION

The rubber component of the rubber vibration isolator composition of the invention uses together as the chief ingredients: natural rubber (NR) and a high-cis-content isoprene rubber (IR) having a cis-1,4 bond content of at least 95%. The compounding ratio of the natural rubber (NR) and the high-cis-content isoprene rubber (IR), expressed as a weight ratio, is generally in the range of NR/IR=95/5 to 45/55, and preferably in the range of 90/10 to 45/55. At an IR proportion where NR/IR=95/5 (weight ratio) or more, full advantage can be taken of the properties possessed by the high-cis-content isoprene rubber, as a result of which an improvement in the low-temperature properties can be expected. At an IR proportion where NR/IR=45/55 (weight ratio) or less, the mechanical characteristics which are the greatest feature of natural rubber (NR) are manifested, as a result of which a good tensile strength can be expected.

The natural rubber used here, although not particularly limited, may be suitably selected from among known natural rubbers. Illustrative examples include ribbed smoked sheets (RSS) and technically specified rubber (TSR).

The isoprene rubber (IR) used here is a high-cis-content isoprene rubber. Specifically, to improve the rubber properties such as tensile strength and the low-temperature properties, it is essential for the cis-1,4 bond content to be at least 95%.

The isoprene rubber (IR) is not particularly limited, so long as the above cis content is satisfied; a known isoprene rubber, such as IR 2200 from JSR Corporation may be suitably selected and used.

Although a rubber component containing NR and IR is used in this invention, in addition to these rubbers, other rubbers such as known synthetic rubbers may also be optionally used, within a range that does not depart from the objects of the invention. Illustrative examples include synthetic rubbers such as butadiene rubber (BR), styrene-butadiene rubber (SBR), acrylonitrile-butadiene rubber (NBR), chloroprene rubber (CR), isobutylene-isoprene rubber, silicone rubber (Q), acrylic rubber (ACM), ethylene-propylene rubber (EPDM) and acrylate-butadiene rubber, as well as molecular chain end group-modified versions of these synthetic rubbers. One, two or more such additional rubbers may be suitably selected and used.

The rubber composition of the invention includes a crosslinking agent in the above rubber component. Examples of the crosslinking agent include, without particular limitation, known crosslinking agents or co-crosslinking agents (crosslinking agents and co-crosslinking agents are referred to collectively below as "crosslinking agents"), such as sulfur, citraconimide compounds, 1,6-bis(N,N'-dibenzylthiocarbamoyldithio), bismaleimide compounds, ZA (zinc diacrylate), ZMA (zinc methacrylate), ethylene glycol dimethylate, TAIC, and amylphenol disulfide polymers. One of these may be used singly, or combinations of two or more may be included.

The rubber composition of the invention also includes an aromatic sulfonamide of the structural formula shown below. By including such a substance, it is possible to more effectively obtain a rubber vibration isolator having outstanding low-temperature properties, the improvement of which has not been achievable by resorting to the hitherto adjusted sulfur/vulcanization accelerator ratio or to the type of vulcanization accelerator alone.

[Chemical Formula 1]

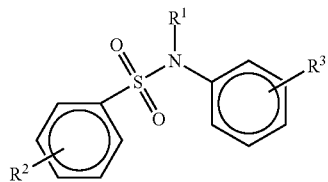

Here, $R^1$ is a moiety of the formula $-S_x-C_nH_mCl_p$, wherein x is an integer of 0 or more, n is an integer of 1 or more, m is an integer of 0 or more and p is an integer of 1 or more, such as to satisfy the condition $m+p=2n+1$. Also, S is a sulfur atom, C is a carbon atom, H is a hydrogen atom and Cl is a chlorine atom that may be substituted with another halogen element. In the above formula, $R^2$ and $R^3$ are each a hydrogen atom, an amino group, or a hydrocarbon group of 1 to 8 carbon atoms that is linear, branched, cyclic or a combination thereof, without limitation as to the position and number of substituents thereon.

Illustrative examples of the aromatic sulfonamide include N-phenyl-N-(monochloromethylthio)toluenesulfonamide, N-phenyl-N-(dichloromethylthio)toluenesulfonamide, N-phenyl-N-(dichloromethylthio)toluenesulfonamide, N-phenyl-N-(monochloromethylthio)toluenesulfonamide, N-phenyl-N-(trichloromethylthio)benzenesulfonamide, N-phenyl-N-(dichloromethylthio)benzenesulfonamide, N-phenyl-N-(trichloromethylthio)benzenesulfonamide, N-phenyl-N-(trichloroethylthio)benzenesulfonamide and N-phenyl-N-(trichloropropylthio)benzenesulfonamide. The use of N-phenyl-N-(trichloromethylthio)benzenesulfonamide of the following formula is especially preferred.

[Chemical Formula 2]

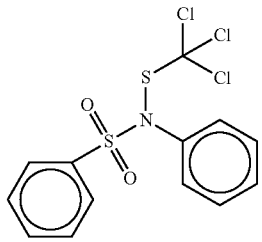

An example of a specific trade name for this N-phenyl-N-(trichloromethylthio)benzenesulfonamide is Vulkalent E/C (from Lanxess AG).

The amount of aromatic sulfonamide included is not particularly limited. However, for greater improvement in, for example, the low-temperature properties, the content is preferably from 0.1 to 4 parts by weight per 100 parts by weight of the rubber component.

In addition, a vulcanization accelerator may be used in the rubber composition of the invention. The vulcanization accelerator is exemplified by, but not particularly limited to, benzothiazole-type vulcanization accelerators such as 2-mercaptobenzothiazole, dibenzothiazyl disulfide, N-cyclohexyl-2-benzothiazyl sulfenamide, N-t-butyl-2-benzothiazyl sulfenamide and N-t-butyl-2-benzothiazyl sulfenamide; guanidine-type vulcanization accelerators such as diphenylguanidine; thiuram-type vulcanization accelerators such as tetramethylthiuram disulfide, tetraethylthiuram disulfide, tetrabutylthiuram disulfide, tetradodecylthiuram disulfide, tetraoctylthiuram disulfide, tetrabenzylthiuram disulfide and dipentamethylenethiuram tetrasulfide; dithiocarbamic acid salts such as zinc dimethyldithiocarbamate; and the others such as zinc dialkyldithiophosphates.

The vulcanization accelerator is exemplified by sulfenamide-type, thiuram-type, thiazole-type, guanidine-type and dithiocarbamic acid salt-type accelerators. A single vulcanization accelerator may be used alone, or two or more may be used together. In order to adjust the vulcanization behavior (rate), for example, it is preferable to use a combination of a thiuram-type and/or a thiazole-type vulcanization accelerator having a relatively high vulcanization accelerating ability with a guanidine-type and/or a sulfenamide-type vulcanization accelerator having a relatively moderate to low vulcanization accelerating ability. Specific examples include the combination of tetramethylthiuram disulfide with N-cyclohexyl-2-benzothiazyl sulfenamide, the combination of tetrabutylthiuram disulfide with N-t-butyl-2-benzothiazyl sulfenamide, and the combination of dibenzothiazyl disulfide with diphenylguanidine. Combinations of vulcanization accelerators are not limited to the above combinations. The total amount of vulcanization accelerator included per 100 parts by weight of the rubber component is preferably from 0.2 to 10 parts by weight.

The rubber composition of the invention may or may not include sulfur. However, the various properties of the rubber can be even further improved when the rubber composition includes sulfur. When sulfur is included, the content of sulfur per 100 parts by weight of the rubber component is preferably from 0.1 to 1.5 parts by weight, and more preferably from 0.2 to 1.0 part by weight.

In this invention, a vulcanization co-accelerator such as zinc white (ZnO) or a fatty acid may be included to help promote vulcanization. The fatty acid may be a straight-chain or branched fatty acid that is saturated or unsaturated. The number of carbons on the fatty acid is not particularly limited, although a fatty acid of 1 to 30 carbons, and preferably 15 to 30 carbons, is advantageous. Specific examples include naphthenic acids such as cyclohexanoic acid (cyclohexanecarboxylic acid) and alkylcyclopentanes having side chains; saturated fatty acids such as hexanoic acid, octanoic acid, decanoic acid (including branched carboxylic acids such as neodecanoic acid), dodecanoic acid, tetradecanoic acid, hexadecanoic acid and octadecanoic acid (stearic acid); unsaturated fatty acids such as methacrylic acid, oleic acid, linoleic acid and linolenic acid; and resin acids such as rosin, tall oil acids and abietic acid. These may be used singly, or two or more may be used in combination. In this invention, preferred use can be made of zinc white and stearic acid. The content of these co-accelerators per 100 parts by weight of the rubber component is preferably from 1 to 10 parts by weight, and more preferably from 2 to 7 parts by weight.

A known oil may be used. Examples include, without particular limitation, process oils such as aromatic oils, naphthenic oils and paraffinic oils; vegetable oils such as coconut oil; synthetic oils such as alkylbenzene oils; and castor oil. In this invention, the use of naphthenic oils is preferred. These may be used singly or two or more may be used in combination. The content of such oils per 100 parts by weight of the rubber component, although not particularly limited, may be set to generally from 2 to 80 parts by weight. At a content outside of the above range, the kneading workability may worsen. When oil-extended rubber is used in the rubber component, the oil included in the rubber should be such that the combined amount of such oil and any oils that are separately added during mixing falls within the above range.

A known carbon black may be used. Examples include, without particular limitation, carbon blacks such as FEF, SRF, GPF, HAF, ISAF, SAF, FT and MT. In this invention, preferred use can be made of FEF. These carbon blacks may be used. singly or two or more may be used in combination. The content of such carbon blacks is generally from 15 to 80 parts by weight per 100 parts by weight of the rubber component.

A known antidegradant may be used. Examples include, without particular limitation, phenolic antidegradants, imidazole-type antidegradants and amine-type antidegradants. The content of these antioxidants per 100 parts by weight of the rubber component is generally from 1 to 10 parts by weight, and preferably from 2 to 7 parts by weight. A single antidegradant may be used alone or two or more antidegradants may be used in combination.

Where necessary, additives commonly used in the rubber industry, such as waxes, antioxidants, fillers, blowing agents, plasticizers, oils, lubricants, tackifiers, petroleum-based resins, ultraviolet absorbers, dispersants, compatibilizing agents, homogenizing agents and vulcanization retardants, may be suitably included with respect to the rubber component, provided the use of these additives does not detract from the advantageous effects of the invention.

The method used to compound the various above ingredients when preparing the rubber composition of the invention is not particularly limited. Kneading may be carried out by compounding all the ingredient starting materials at once, or kneading may be carried out by compounding the respective ingredients in two or three separate stages. A mixer such as roll mill, an internal mixer or a Banbury rotor may be used to carry out kneading. In addition, a known apparatus such as an extruder or a press may be used when forming the rubber composition into a sheet, strip or the like.

The vulcanization conditions when curing the above rubber composition are not particularly limited, although 5 to 120 minutes of vulcanization at 140 to 180° C. can generally be carried out.

The rubber vibration isolator of the invention is obtained by vulcanizing the above-described rubber composition, and may be used in various types of vibration isolating members. Vibration isolating members generally include as the structural elements: the above rubber composition, metal and an adhesive. By applying heat and pressure to the unvulcanized rubber composition and the metal with the adhesive therebetween, the rubber composition is vulcanized and, at the same time, the vulcanized rubber bonds with the metal, enabling a vibration isolating member to be obtained. In addition, where necessary, a resin may be included as a structural element in the vibration isolating member. In such a case, the vibration isolating member has a construction in which various adhesives are respectively interposed between the vulcanized rubber and the metal and between the vulcanized rubber and the resin. Such vibration isolating members are suitably used in those parts of an automobile that are exposed to elevated temperatures, such as torsional dampers, engine mounts or muffler hangers, but are not limited to such uses.

EXAMPLES

The invention is illustrated more fully below by way of Working Examples and Comparative Examples, although the invention is not limited by these Examples.

Working Examples 1 to 11, Comparative Examples 1 to 10

The compounding formulations shown in Tables 1 to 3 below were kneaded and vulcanized, and the rubber vibration isolating compositions of Working Examples 1 to 11 and Comparative Examples 1 to 10 were each vulcanized and cured under given conditions, thereby producing sheets having a length of 120 mm, a width of 120 mm and a thickness of 2 mm. The resulting rubber sheets were evaluated by measuring the hardness (Hd), tensile elongation (Eb) and tensile strength (Tb) in accordance with the following JIS standards indicated below. Evaluations of these properties are shown in Tables 1, 2 and 3 as indexed values (INDEX) based on, as reference values, the results obtained in, respectively, Comparative Example 1, Comparative Example 4 and Comparative Example 8. That is, the indexed rubber properties are based on an arbitrary value of 100 for data values obtained in Comparative Example 1, Comparative Example 4 and Comparative Example 8. The shape of the measurement samples and the conditions for evaluating the low-temperature properties are given below.

[Hardness (Hd)]

Measurement was carried out in accordance with JIS K 6253 (type A).

[Tensile Elongation (Eb)]

Measurement was carried out in accordance with JIS K 6251. Indexed values based on an arbitrary value of 100 for the data values in the Comparative Examples serving as the references are shown. A higher value indicates a better tensile elongation (Eb).

[Tensile Strength (Tb)]

Measurement was carried out in accordance with JIS K 6251. Indexed values based on an arbitrary value of 100 for the data values in the Comparative Examples serving as the references are shown. A higher value indicates a better tensile strength (Tb).

[Low-Temperature Properties]

A cylindrical rubber sample having a diameter of 30 mm and a height of 30 mm was fabricated, and the Kd value was measured at 100 Hz (this is treated as the initial Kd value) in accordance with JIS K 6385. Next, after 10 days of exposure at −35° C., the Kd value was rapidly measured in the same way under the above conditions (this was treated as the Kd value after low-temperature exposure). The low-temperature properties were calculated as the ratio (Kd after low-temperature exposure)/(initial Kd) and entered in the tables as indexed values based on an arbitrary value of 100 for the low-temperature property in the Comparative Example serving as the reference. A small change in Kd after low-temperature exposure is good as the low-temperature properties; a lower indexed value indicates better low-temperature properties.

Details on the starting materials are shown below, although the invention is not limited to these starting materials.

Rubber Component
  Natural rubber (NR): "RSS#4"
  High-cis-content isoprene rubber (IR): "IR2200" from JSR Corporation; cis-1,4 bond content, ≥95%
  Isoprene rubber (IR): "Cariflex IR0307" from Kraton Performance Polymers, Inc.

Carbon Black
  FEF carbon black was used: "Beast F" from Tokai Co., Ltd.

Stearic Acid
  "Stearic Acid 50S" from New Japan Chemical Co., Ltd.

Zinc White
  Available as "No. 3 Zinc White" (Hakusui Tech Co., Ltd.)

Antidegradant: RD
  2,2,4-Trimethyl-1,2-dihydroquinoline polymer, available as "Nocrac 224" from Ouchi Shinko Chemical Industry Co., Ltd.

Antidegradant: 6C
  N-Phenyl-N'-(1,3-dimethylbutyl)-p-phenylenediamine, available as "Nocrac NS-6" from Ouchi Shinko Chemical Industry Co., Ltd.

Microcrystalline Wax
  Available as "Suntight S" from Seiko Chemical Co., Ltd.

Naphthenic Oil
  "Sunthene 4240" from Sun Refining and Marketing Company

Sulfur
  Available as "Sulfur Powder" from Tsurumi Chemical

N,N'-m-Phenylenebismaleimide
  Available as "Vulnoc PM" from Ouchi Shinko Chemical industry Co., Ltd.

Thiuram-Type Vulcanization Accelerator: TT
  Available under the trade name "Accel TMT-PO" from Kawaguchi Chemical Industry Co., Ltd.

Sulfenamide-Type Vulcanization Accelerator: CZ
  Available under the trade name "Nocceler CZ-G" (Ouchi Shinko Chemical Industry Co., Ltd.)

Aromatic Sulfonamide
  N-Phenyl-N-(trichloromethylthio)benzenesulfonamide, available under the trade name "Vulkalent E/C" from Lanxess AG

TABLE 1

| (parts by weight) | | Comparative Example 1 (reference value) | 2 | 3 | Working Example 1 | 2 | 3 | 4 | 5 |
|---|---|---|---|---|---|---|---|---|---|
| Rubber formulation ingredients | NR | 100.0 | 100.0 | 80.0 | 95.0 | 80.0 | 70.0 | 60.0 | 45.0 |
| | High-cis-content IR | | | | 5.0 | 20.0 | 30.0 | 40.0 | 55.0 |
| | Isoprene rubber (IR) | | | 20.0 | | | | | |
| | Carbon black (CB) | 20 | 20 | 20 | 20 | 20 | 20 | 20 | 20 |
| | Stearic acid | 2.0 | 2.0 | 2.0 | 2.0 | 2.0 | 2.0 | 2.0 | 2.0 |
| | Zinc white | 3.0 | 3.0 | 3.0 | 3.0 | 3.0 | 3.0 | 3.0 | 3.0 |
| | Antidegradant: RD | 1.0 | 1.0 | 1.0 | 1.0 | 1.0 | 1.0 | 1.0 | 1.0 |
| | Antidegradant: 6C | 3.0 | 3.0 | 3.0 | 3.0 | 3.0 | 3.0 | 3.0 | 3.0 |
| | Microcrystalline wax | 2.0 | 2.0 | 2.0 | 2.0 | 2.0 | 2.0 | 2.0 | 2.0 |
| | Naphthenic oil | 5.0 | 5.0 | 5.0 | 5.0 | 5.0 | 5.0 | 5.0 | 5.0 |
| | Sulfur | 0.6 | 0.6 | 0.6 | 0.6 | 0.6 | 0.6 | 0.6 | 0.6 |
| | N,N'-m-Phenylenebis-maleimide | 4.0 | 4.0 | 4.0 | 4.0 | 4.0 | 4.0 | 4.0 | 4.0 |
| | Thiuram-type accelerator: TT | 1.5 | 1.5 | 1.5 | 1.5 | 1.5 | 1.5 | 1.5 | 1.5 |
| | Sulfenamide-type accelerator: CZ | 1.5 | 1.5 | 1.5 | 1.5 | 1.5 | 1.5 | 1.5 | 1.5 |
| | Aromatic sulfonamide | 2.0 | — | 2.0 | 2.0 | 2.0 | 2.0 | 2.0 | 2.0 |
| Rubber properties | Hardness (Hd) | 50 | 50 | 50 | 50 | 50 | 50 | 50 | 50 |
| | Tensile elongation (Eb) INDEX | 100 | 100 | 106 | 105 | 100 | 98 | 98 | 98 |
| | Rating | UC | UC | UC | UC | UC | UC | UC | UC |
| | Tensile INDEX | 100 | 100 | 87 | 105 | 96 | 94 | 93 | 91 |

TABLE 1-continued

|  | (parts by weight) | | Comparative Example 1 (reference value) | 2 | 3 | Working Example 1 | 2 | 3 | 4 | 5 |
|---|---|---|---|---|---|---|---|---|---|---|
| strength (Tb) | Rating | | UC | UC | Fair | UC | UC | UC | UC | UC |
| Low temperature properties | INDEX | | 100 | 357 | 85 | 90 | 80 | 76 | 74 | 72 |
|  | Rating | | UC | NG | Good | Good | Exc | Exc | Exc | Exc |

<Ratings of Percent Change Relative to Reference Value>

The percent change relative to reference values in the respective tables (Comparative Example 1, Comparative 4, Comparative Example 8) for the rubber properties in each of the Working Examples and Comparative Examples were rated based on the following criteria, and entered into the tables.

Exc: Improved more than 20%
Good: Improved at least 10% but less than 20%
UC: Unchanged (less than 10% change)
Fair: Worsened at least 10% but less than 20%
NG: Worsened more than 20%

The following was apparent from the results in Table 1.

Working Examples 1 to 5 show that, relative to Comparative Example 1, the low-temperature properties can be improved and good strength properties (hardness, tensile elongation, tensile strength) can be maintained. In particular, Working Examples 1 to 5 all showed improvements of at least 10 points in the indexed values for low-temperature properties. On the other hand, Comparative Example 3 shows a worsening of more than 10 points in the indexed value for tensile strength (Tb) relative to Comparative Example 1, and Comparative Example 2 shows a pronounced worsening in low-temperature properties.

TABLE 2

|  | (parts by weight) | Comparative Example 4 (reference value) | Working Example 5 | 6 | 7 | 8 | 9 | Comparative Example 6 | 7 |
|---|---|---|---|---|---|---|---|---|---|
| Rubber formulation ingredients | NR | 100.0 | 80.0 | 80.0 | 45.0 | 45.0 | 45.0 | 45.0 | 100.0 |
|  | High-cis-content IR |  | 20.0 | 20.0 | 55.0 | 55.0 | 55.0 | 55.0 |  |
|  | Carbon black (CB) | 20 | 20 | 20 | 20 | 20 | 20 | 20 | 20 |
|  | Stearic acid | 2.0 | 2.0 | 2.0 | 2.0 | 2.0 | 2.0 | 2.0 | 2.0 |
|  | Zinc white | 3.0 | 3.0 | 3.0 | 3.0 | 3.0 | 3.0 | 3.0 | 3.0 |
|  | Antidegradant: RD | 1.0 | 1.0 | 1.0 | 1.0 | 1.0 | 1.0 | 1.0 | 1.0 |
|  | Antidegradant: 6C | 3.0 | 3.0 | 3.0 | 3.0 | 3.0 | 3.0 | 3.0 | 3.0 |
|  | Microcrystalline wax | 2.0 | 2.0 | 2.0 | 2.0 | 2.0 | 2.0 | 2.0 | 2.0 |
|  | Naphthenic oil | 5.0 | 5.0 | 5.0 | 5.0 | 5.0 | 5.0 | 5.0 | 5.0 |
|  | Sulfur | 0.6 | 0.6 | 0.6 | 0.6 | 0.6 | 0.6 | 0.6 | 0.6 |
|  | Thiuram-type accelerator: TT | 1.5 | 1.5 | 1.5 | 1.5 | 1.5 | 1.5 | 1.5 | 1.5 |
|  | Sulfenamide-type accelerator: CZ | 1.5 | 1.5 | 1.5 | 1.5 | 1.5 | 1.5 | 1.5 | 1.5 |
|  | Aromatic sulfonamide | 2.0 | — | 2.0 | 2.0 | 0.1 | 4.0 | — | 4.0 |
| Rubber properties | Tensile elongation (Eb) INDEX | 100 | 105 | 100 | 98 | 108 | 94 | 109 | 89 |
|  | Rating | UC | UC | UC | UC | UC | UC | UC | Fair |
|  | Tensile strength (Tb) INDEX | 100 | 92 | 96 | 92 | 91 | 101 | 90 | 100 |
|  | Rating | UC | UC | UC | UC | UC | UC | Fair | UC |
|  | Low temperature properties INDEX | 100 | 100 | 83 | 80 | 90 | 65 | 95 | 79 |
|  | Rating | UC | UC | Good | Exc | Good | Exc | UC | Exc |

The following was apparent from the results in Table 2.

Working Examples 6 to 9 show that, relative to Comparative Example 4, the low-temperature properties can be improved and good tensile elongation and tensile strength can be maintained. In particular, Working Examples 6 to 9 all showed improvements of at least 10 points in the indexed values for low-temperature properties. On the other hand, Comparative Example 6 shows a worsening of more than 10 points in the indexed value for tensile strength (Tb) relative to Comparative Example 4, and Comparative Example 7 shows a worsening of more than 10 points in the indexed value for tensile elongation (Eb).

TABLE 3

|  | (parts by weight) |  | Comparative Example 8 (reference value) | 9 | 10 | Working Example 10 | 11 |
|---|---|---|---|---|---|---|---|
| Rubber formulation ingredients | NR |  | 100.0 | 95.0 | 100.0 | 95.0 | 95.0 |
|  | High-cis-content IR |  |  | 5.0 |  | 5.0 | 5.0 |
|  | Carbon black (CB) |  | 20 | 20 | 20 | 20 | 20 |
|  | Stearic acid |  |  |  |  |  |  |
|  | Zinc white |  | 3.0 | 3.0 | 3.0 | 3.0 | 3.0 |
|  | Antidegradant: RD |  | 1.0 | 1.0 | 1.0 | 1.0 | 1.0 |
|  | Antidegradant: 6C |  | 3.0 | 3.0 | 3.0 | 3.0 | 3.0 |
|  | Microcrystalline wax |  | 2.0 | 2.0 | 2.0 | 2.0 | 2.0 |
|  | Naphthenic oil |  | 5.0 | 5.0 | 5.0 | 5.0 | 5.0 |
|  | Sulfur |  | 0.6 | 0.6 | 0.6 | 0.6 | 0.6 |
|  | Thiuram-type accelerator: TT |  | 1.5 | 1.5 | 1.5 | 1.5 | 1.5 |
|  | Sulfenamide-type accelerator: CZ |  | 1.5 | 1.5 | 1.5 | 1.5 | 1.5 |
|  | Aromatic sulfonamide |  | — | — | 0.1 | 0.1 | 4.0 |
| Rubber properties | Tensile elongation (Eb) | INDEX | 100 | 102 | 99 | 100 | 91 |
|  |  | Rating | UC | UC | UC | UC | UC |
|  | Tensile strength (Tb) | INDEX | 100 | 103 | 99 | 101 | 112 |
|  |  | Rating | UC | UC | UC | UC | Good |
|  | Low temperature properties | INDEX | 100 | 93 | 95 | 90 | 65 |
|  |  | Rating | UC | UC | UC | Good | Exc |

The following was apparent from the results in Table 3.

Working Examples 10 and 11 show that, relative to Comparative Example 8, the low-temperature properties can be improved and good tensile elongation and tensile strength can be maintained. In particular, Working Examples 10 and 11 showed improvements of at least 10 points in the indexed values for low-temperature properties.

The invention claimed is:

1. A rubber vibration isolator composition characterized by comprising a rubber component consisting of natural rubber and high-cis-content isoprene rubber having a cis-1,4 bond content of at least 95%, a crosslinking agent and an aromatic sulfonamide of the following structural formula

[Chemical Formula 1]

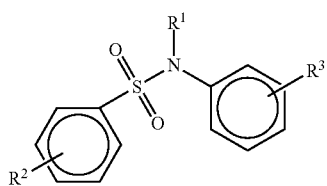

wherein $R^1$ is a moiety of the formula $-S_x-C_nH_mCl_p$, x being an integer of 0 or more, n being an integer of 1 or more, m being an integer of 0 or more and p being an integer of 1 or more, such as to satisfy the condition m+p=2n+1, and S being a sulfur atom, C being a carbon atom, H being a hydrogen atom, and Cl being a chlorine atom that may be substituted with another halogen element; and $R^2$ and $R^3$ are each a hydrogen atom, an amino group, or a hydrocarbon group of 1 to 8 carbon atoms that is linear, branched, cyclic or a combination thereof, without limitation as to the position and number of substituents thereon.

2. The rubber vibration isolator composition of claim 1, wherein the weight ratio of the natural rubber to the high-cis-content isoprene rubber having a cis-1,4 bond content of at least 95% is from 95/5 to 45/55.

3. The rubber vibration isolator composition of claim 1, wherein the content of aromatic sulfonamide is from 0.1 to 4 parts by weight per 100 parts by weight of the rubber component.

4. A rubber vibration isolator obtained by curing the rubber composition of claim 1.

* * * * *